Jan. 15, 1963 M. F. AMSTERDAM 3,073,989

IMAGE CONVERTER DEVICE

Filed April 18, 1960 2 Sheets-Sheet 1

INVENTOR
MICHAEL F. AMSTERDAM
BY S. J. Rotondi,
A. J. Dupont & S. Dubroff
ATTORNEYS Jan. 15, 1963 M. F. AMSTERDAM 3,073,989
IMAGE CONVERTER DEVICE
Filed April 18, 1960 2 Sheets-Sheet 2
Fig. 4
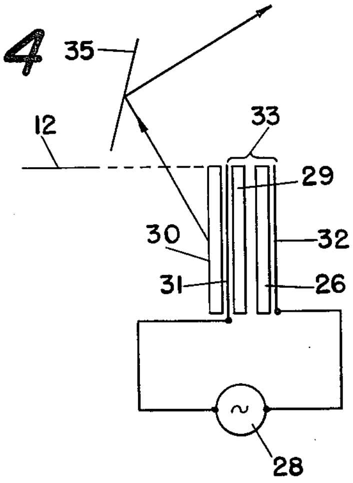
Fig. 5
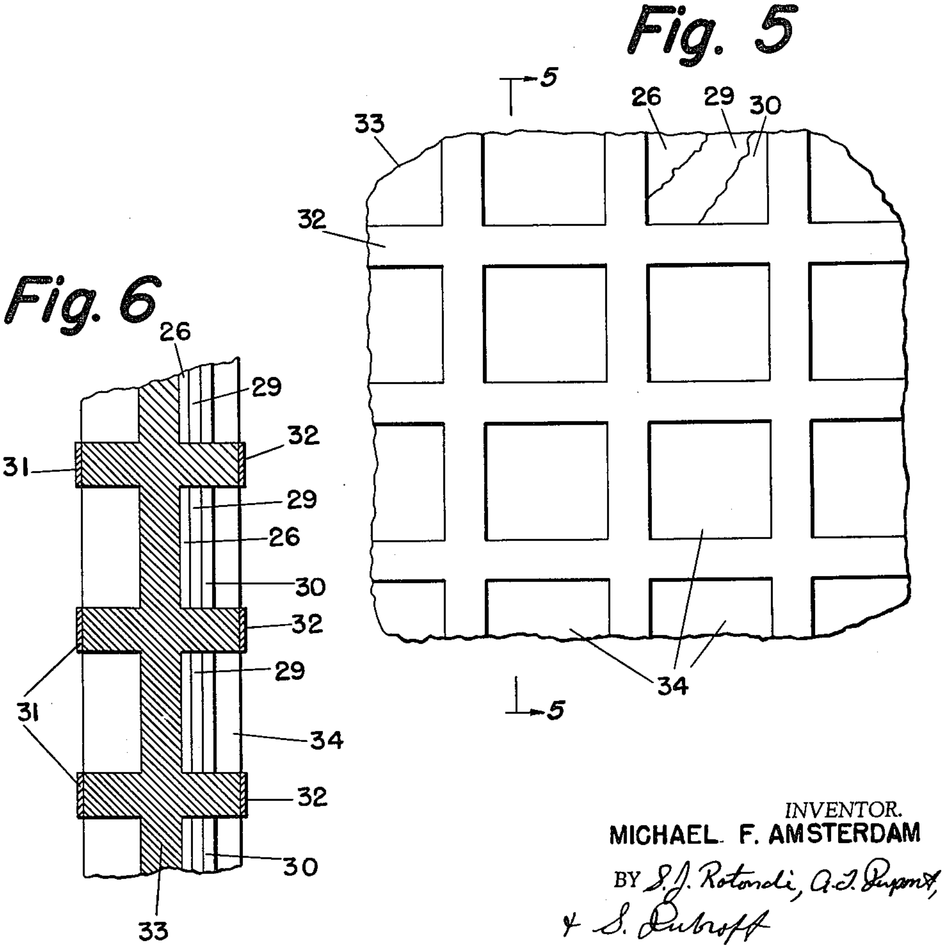
Fig. 5, Fig. 6
INVENTOR.
MICHAEL F. AMSTERDAM
BY S. J. Rotondi, A. J. Dupont, & S. Dubroff
ATTORNEYS United States Patent Office 3,073,989
Patented Jan. 15, 1963

3,073,989

IMAGE CONVERTER DEVICE

Michael F. Amsterdam, Greensburg, Pa., assignor to the United States of America as represented by the Secretary of the Army Filed Apr. 18, 1960, Ser. No. 23,109
3 Claims. (Cl. 315—8.5)
(Granted under Title 35, U.S. Code (1952), sec. 266)

Figure 1:
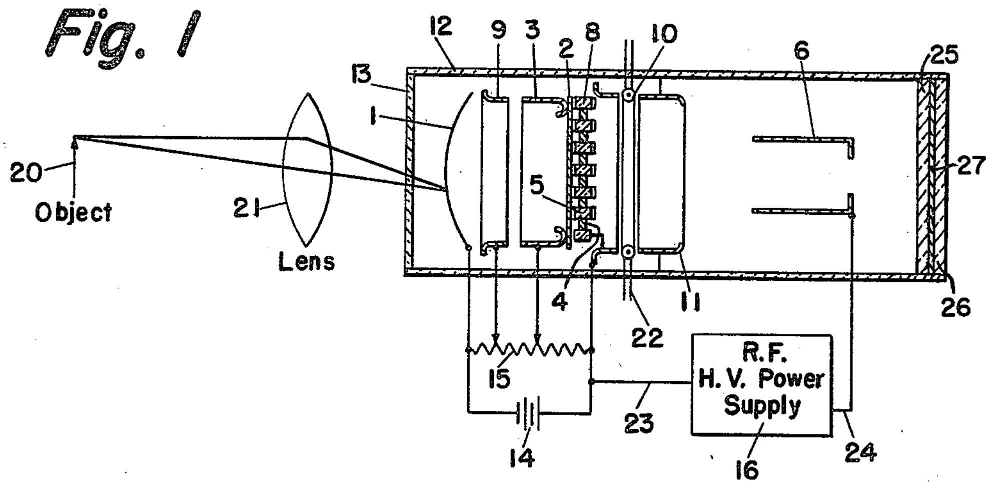

The invention decribed herein may be manufactured and used by or for the Government for governmental purposes without the payment to me of any royalty thereon.

This invention relates to image converter devices, and more particularly to an improved device which operates to store, intensify and reproduce the images of meagerly illuminated objects of scenes such as the night-time surroundings of a tank or the like.

It has been proposed to provide a vehicle, such as a tank, with an image orthicon and monitor kinescope arranged to produce inside the vehicle on the kinescope screen an image of the vehicle's surroundings when such surroundings are not otherwise readily visible. This arrangement is complicated by the use of two separate tubes with their associated deflection circuits and has a relatively low signal-to-noise ratio due to the noise introduced by the scanning beam in the camera tube. In accordance with the present invention, these difficulties are eliminated by the provision of an improved image converter which requires only one tube and obviates the need of any deflection circuits. This has the important advantages that it greatly simplifies the construction of the apparatus and increases its sensitivity.

The invention will be better understood from the following description when considered in connection with the accompanying drawings and its scope is indicated by the appended claims.

Figure 2:
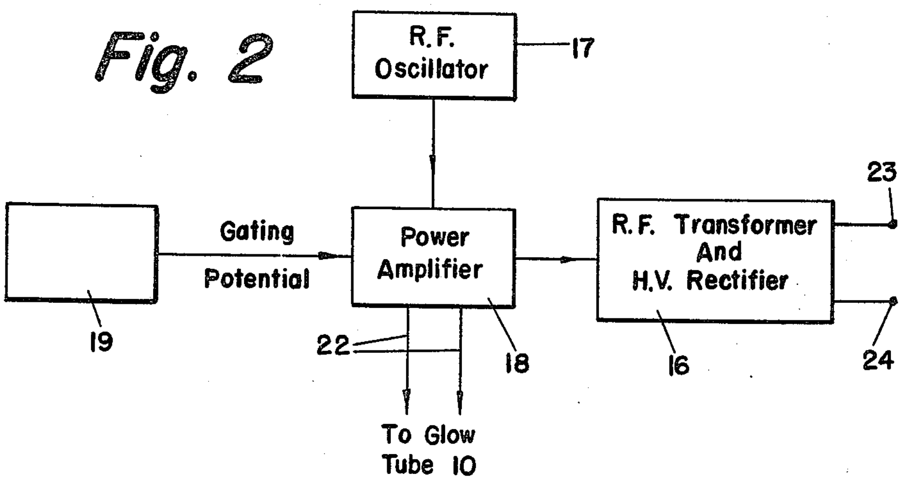
Figure 3:
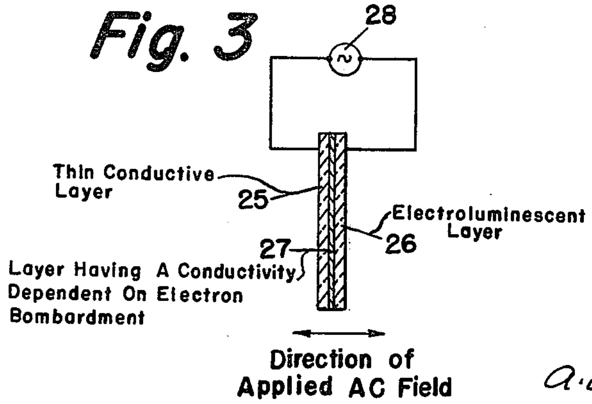

Referring to the drawings:

FIG. 1 indicates the various details of the improved image converter,

FIG. 2 is a block diagram illustrating the circuits involved in the operation of the converter, FIGS. 3 and 4 illustrate modifications of the screen on which the image is reproduced and viewed, and FIGS. 5 and 6 illustrate structural details of the screen depicted by FIG. 4.

The image converter of FIG. 1 includes an evacuated container 12 which has a window 13 at one end, has a screen 25—26—27 at the other end, and is otherwise opaque. Mounted within this container are a photocathode 1, a conductive film 2 of aluminum or the like, electron lens electrodes 3, 6, 9 and 11, an image storage electrode formed of plugs 4 of a photoemissive conducting material and a light source 10 of the gas discharge glow tube type. The plugs 4 are each located in a different mesh of a sieve-like sheet 8 of glass which has a high resistivity. Suitable for this purpose is a product current available under the trade name "Photoform Glass."

The electron lens electrode 3 is connected to the conductive film 2, the electron lens electrode 11 is connected to a conductive film 5 and operating voltage is applied to to the electrodes 3, 9, and 11 from a source 14 through a potentiometer 15.

Between the electrodes 11 and 6 is applied a high unidirectional voltage. This unidirectional voltage is obtained by amplifying the output of a radio frequency oscillator 17 in a power amplifier 18 and transmitting the amplified output through a transformer-rectifier-filter unit 16 to leads 23 and 24. The time intervals during which this voltage is available at the leads 23 and 24 is determined by a gating circuit 19 which applies to the input of the power amplifier 18 a square topped voltage wave by which the amplifier is biased to cutoff while the image is stored on the plugs 4.

Storing of the image of the object 20 (FIG. 1) is effected by passing light from the object through a lens 21 which focuses the image on the photocathode 1. This causes the emission of photoelectrons which are accelerated by the voltage between the electrodes 9 and 3 and strike the film 2 with sufficient energy to produce secondary electron emission. The electrons so produced are then drawn onto the photo-emissive plugs 4 due to the electric field produced by the voltage between the electrodes 3 and 11. The completes the image storing phase of the operation and is accomplished during one negative half cycle of the gating voltage.

Transfer of the image from the plugs 4 to the screen 25—26—27 occurs during the positive half cycle of the gating voltage. During this time interval, voltage is applied (1) through leads 22 of the amplifier 18 to the gas discharge glow tube or lamp 10 and (2) through leads 23 and 24 to the electron lens electrodes 11 and 6. Lighting of the glow tube 10 causes the electron image stored in elements 4 to be photo-emitted, and the electron lens electrodes cause this image to be focussed onto the screen 25—26—27 which produces a light image of greater intensity than that falling on the photocathode 1.

As will be apparent to those skilled in the art, the tube 12 will form a visible light image when the incident light is of infra red (non-visible) wave length provided the photo-cathode material is sensitive to infra-red radiation.

The details of the screen 25—26—27 are indicated by FIG. 3. They include a thin electron bombardment induced conductivity layer 25 and an electroluminescent layer 26 between which is placed a layer 27 of a material having a conductivity dependent on the extent to which it is bombarded by electrons. Connected between the layers 25 and 26 is an alternating voltage source 28.

zWith these connections, the layer 27 is simultaneously subjected to the voltage of the source 28 and bombarded by the electron image. Where the intensity of the electrons is relatively large, the ohmic resistance is reduced to a relatively low value, and a higher alternating voltage appears across the layer 26 which glows accordingly. At relatively low intensities of the bombarding electrons, the ohmic resistance of the layer is relatively high and the layer 26 glows less brightly. This modification has the advantage of greater sensitivity. This is so for the reason that the high energy electron image, instead of merely converting its energy into a light image, functions to control a source from which energy is supplied to the layer 26 and produces the final light image. The resulting gain in finally available light allows the use of a larger viewing screen.

FIGS. 4 to 6 illustrate a further modification of the element to which the electron image is applied. In this case, the alternating voltage source 28 is connected between two transparent conductive films 31 and 32 on the opposite sides of a high resistively member 33. This member has a plurality of recessess 34 in each of which is a layer 26 of electroluminescent material, a photoconductive layer 29 and a phosphor layer 30. The phosphor layer 30 is viewed through the medium of a reflector 35.

With this construction, feedback from the electroluminescent layer 26 to the photoconductive layer 29 permits image storage during the time the A.-C. potential is maintained. The electroluminescent layer 26 is so deposited as to inhibit the transmission of light from sources external to the tube. The light image formed by the phosphor layer may be viewed through a transparent section of the tube as indicated by FIG. 4. This transparent section is covered during storage of the image.

As in the case of the modification illustrated by FIG. 3, the gain realized from the A.C. source makes possible the use of a larger viewing screen.

I claim:

1. In an image converter, the combination of an opaque evacuated vessel having at one end a window and at the other end an image viewing screen, a photocathode adjacent said window, an image storage electrode intermediate said electrode and screen, said storage electrode including a high resistivity sieve-like member with conducting films on its opposite sides and separate photoemissive conducting plugs in its different meshes, electron lense electrodes between said photocathode and said storage electrode and between said storage electrode and said screen, a lamp arranged to illuminate said storage electrode on the side facing said screen, said screen including an electron bombardment induced conductive layer between a conductive layer and a electroluminescent layer, and means for applying an alternating electric field across said bombardment induced conductivity and electroluminescent layers.

2. An image converter according to claim 1 wherein said screen includes a photoconductive layer between a phosphor layer and an electroluminescent layer and wherein means are arranged to apply an alternating electric field across said photoconductive and said electroluminescent layer.

3. An image converter acording to claim 1 wherein means are provided for applying to said lamp, to said storage electrode and to the electron lens electrodes between said storage electrode and said screen a gating voltage whereby an image is transferred from said storage electrode to said screen.

References Cited in the file of this patent

UNITED STATES PATENTS

| | | |
|---|---|---|
| 2,805,359 | Theile | Sept. 3, 1957 |
| 2,825,834 | Szegho et al. | Mar. 4, 1958 |
| 2,881,353 | Michlin | Apr. 7, 1959 |
| 2,882,419 | Diemer et al. | Apr. 14, 1959 |
| 2,945,973 | Anderson | July 19, 1960 |